(12) United States Patent
Warashina

(10) Patent No.: US 10,910,160 B2
(45) Date of Patent: Feb. 2, 2021

(54) CAPACITOR MODULE HAVING ROUNDED RECTANGULAR PRISM-SHAPED CAPACITOR ELEMENTS

(71) Applicant: Toyota Jidosha Kabushiki Kaisha, Toyota (JP)

(72) Inventor: Taisuke Warashina, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 17 days.

(21) Appl. No.: 16/260,561

(22) Filed: Jan. 29, 2019

(65) Prior Publication Data

US 2019/0237258 A1 Aug. 1, 2019

(30) Foreign Application Priority Data

Jan. 30, 2018 (JP) ................ 2018-014107

(51) Int. Cl.
*H01G 4/224* (2006.01)
*H01G 4/38* (2006.01)

(52) U.S. Cl.
CPC .......... *H01G 4/224* (2013.01); *H01G 4/38* (2013.01)

(58) Field of Classification Search
CPC .................. H01G 4/38; H01G 2/106
See application file for complete search history.

(56) References Cited

U.S. PATENT DOCUMENTS

| | | | | |
|---|---|---|---|---|
| 5,016,139 A | * | 5/1991 | Stopa | H05K 5/0247 307/150 |
| 2011/0102966 A1 | * | 5/2011 | Takeoka | H01G 2/08 361/301.3 |
| 2012/0081866 A1 | * | 4/2012 | Wickett | H01G 2/08 361/301.3 |
| 2019/0198246 A1 | * | 6/2019 | Kanda | H01G 4/258 |

FOREIGN PATENT DOCUMENTS

| JP | 2008130640 A | * | 6/2008 | ........... H01G 4/18 |
|---|---|---|---|---|
| JP | 2009147191 A | * | 7/2009 | |
| JP | 2010040832 A | * | 2/2010 | |
| JP | 2012199350 A | * | 10/2012 | ........... H01G 2/08 |
| JP | 2014068449 A | * | 4/2014 | ........... H01G 4/18 |
| JP | 2014078549 A | * | 5/2014 | |
| JP | 2017-011018 A | | 1/2017 | |

* cited by examiner

*Primary Examiner* — David M Sinclair
(74) *Attorney, Agent, or Firm* — Dinsmore & Shohl LLP

(57) ABSTRACT

A capacitor module includes a plurality of rounded rectangular prism-shaped capacitor elements and a case housing the capacitor elements. The two capacitor elements are disposed in parallel in the case such that respective first side surfaces of the capacitor elements face each other. The case houses the capacitor elements such that second side surfaces of the capacitor elements face a case inner bottom surface of the case. The second side surface is adjoining the first side surface. The case includes at least one of a protrusion or a hole on the side of a case outer bottom surface of the case at an element boundary portion sandwiched between two rounded corners. The round corners are each provided at a boundary between the first side surface and the second side surface.

4 Claims, 4 Drawing Sheets

CAPACITOR MODULE HAVING ROUNDED RECTANGULAR PRISM-SHAPED CAPACITOR ELEMENTS

CROSS-REFERENCE TO RELATED APPLICATIONS

This application claims priority to Japanese Patent Application No. 2018-014107 filed on Jan. 30, 2018, which is incorporated herein by reference in its entirety.

BACKGROUND

1. Technical Field

A technique to be disclosed by this specification relates to a capacitor module in which a plurality of capacitor elements is housed in a case.

2. Description of Related Art

Japanese Patent Application Publication No. 2017-011018 (JP 2017-011018 A) discloses a capacitor module in which a plurality of capacitor elements is housed in a case, with a molding resin packed between the case and the capacitor elements. Capacitor elements each have an external shape of a rounded rectangular prism. The capacitor elements are arrayed in parallel such that first side surfaces of adjacent capacitor elements face each other, and are housed in the case such that second side surfaces adjoining the first side surfaces face a bottom surface on a case inner side. Hereinafter, a portion of a bottom part of the case that is sandwiched between rounded corners of adjacent capacitor elements (rounded corners each provided at a boundary between the first side surface and the second side surface) will be referred to as an element boundary portion. In the capacitor module of JP 2017-011018 A, a groove extending along an axial direction of the prism-shaped capacitor element is provided on the side of a case outer bottom surface at each element boundary portion.

SUMMARY

Some cases have a positioning protrusion or hole, or both positioning protrusion and hole, provided on the outer side in order that the capacitor module can be mounted on another component, or that a device that handles the capacitor module can grasp the capacitor module during manufacturing. This specification provides a capacitor module in which the element boundary portion of the bottom of the case is effectively used to provide at least one of a protrusion or hole, without increasing the external dimensions of the capacitor module.

According to an aspect disclosed by this specification, a capacitor module including at least two rounded rectangular prism-shaped capacitor elements and a case is provided. The case houses these capacitor elements. Two of the capacitor elements are disposed in parallel in the case such that respective first side surfaces of the capacitor elements face each other. The case houses the capacitor elements such that second side surfaces of the capacitor elements face a case inner bottom surface of the case. Moreover, the case includes at least one of a protrusion or a hole on the side of a case outer bottom surface of the case at an element boundary portion sandwiched between two rounded corners. The round corners are each provided at a boundary between the first side surface and the second side surface.

In the above-described capacitor module, the capacitor module can be made thicker at the element boundary portion facing the rounded corners of the capacitor elements, which is convenient for providing the hole to be used for positioning.

In the capacitor module, in the case where the capacitor module is provided with the protrusion on the side of the case outer bottom surface at the element boundary portion, a groove extending along an axis of the capacitor element may be provided on the side of the case outer bottom surface at the element boundary portion, and the protrusion may be provided in this groove. In this case, a leading end surface of the protrusion may be provided in the same plane as a flat portion of the case outer bottom surface corresponding to the second side surface of the capacitor element. Or the leading end surface of the protrusion may be located on a more inner side of the case than the flat portion of the case outer bottom surface corresponding to the second side surface of the capacitor element.

In the above-described capacitor module, since the protrusion does not protrude from the flat portion of the case outer bottom surface, the protrusion does not add to the external dimensions of the capacitor module.

Details and further improvements of the technique disclosed by this specification will be described in "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
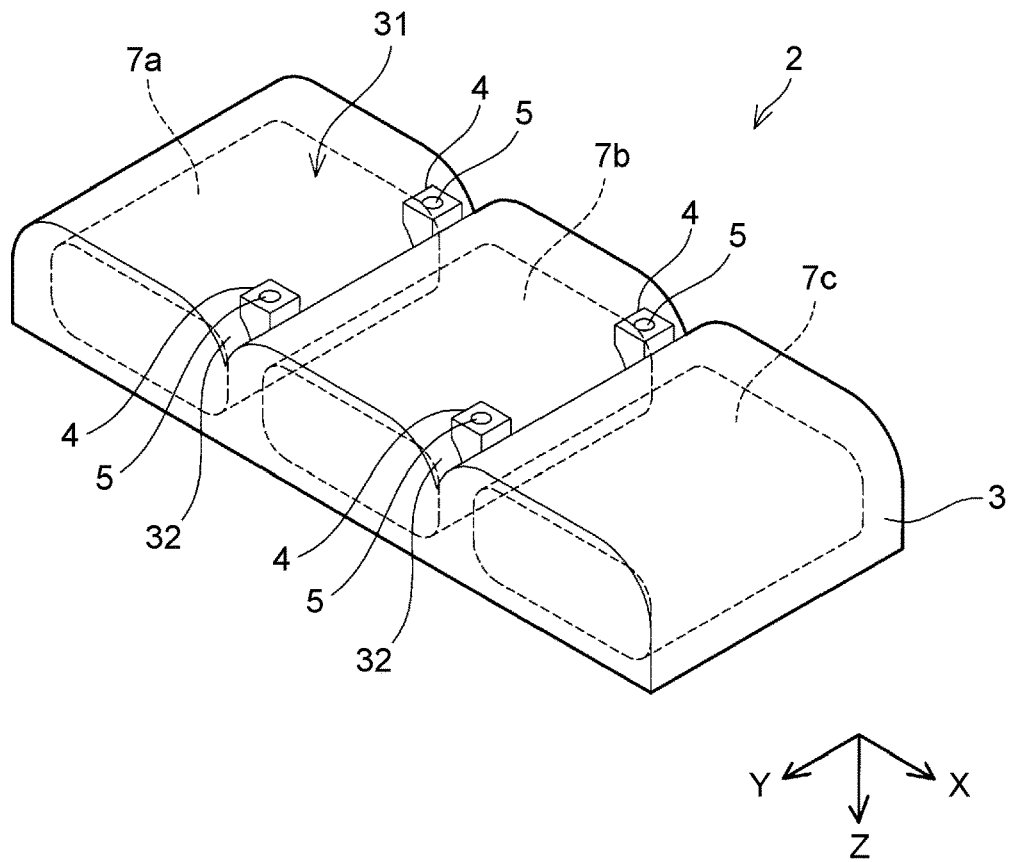
FIG. 1 is a perspective view of a capacitor module in an embodiment of the present disclosure.

A capacitor module 2 of an embodiment will be described with reference to the drawings. FIG. 1 is a perspective view of the capacitor module 2. The capacitor module 2 is a device in which three capacitor elements 7a, 7b, 7c are housed in a case 3. The capacitor elements 7a, 7b, 7c each have a shape of a rounded rectangular prism. The direction of an axis of the rounded rectangular prism of each of the capacitor elements 7a, 7b, 7c coincides with the Y-direction in the coordinate system of FIG. 1. The three capacitor elements 7a, 7b, 7c are housed in the case 3 such that the axes thereof are parallel to one another.

Openings of the case 3 through which the capacitor elements 7a, 7b, 7c are inserted face downward in FIG. 1. Thus, FIG. 1 is a view of the capacitor module 2 as seen from an obliquely lower side. The +Z-direction and the −Z-direction in the coordinate system of FIG. 1 correspond respectively to an upper side and a lower side. A surface of the case 3 facing upward in FIG. 1 is a bottom surface on an outer side (outer bottom surface 31) of the case 3. Grooves 32 are provided in the outer bottom surface 31 of the case 3. The grooves 32 are provided between the adjacent capacitor elements 7a, 7b and between the adjacent capacitor elements 7b, 7c. Protrusions 4 are provided in the grooves 32, and a hole 5 is provided in a leading end surface of each protrusion 4. As shown in FIG. 1, four protrusions 4 are provided in the outer bottom surface 31 of the case 3. In the manufacturing process of the capacitor module 2, a handling device (not shown) inserts pins into the holes 5 of the protrusions 4, and thereby the position of the case 3 relative to the handling device is determined. The protrusions 4 and the holes 5 are provided for positioning of the case 3 (capacitor module 2).

Figure 2:
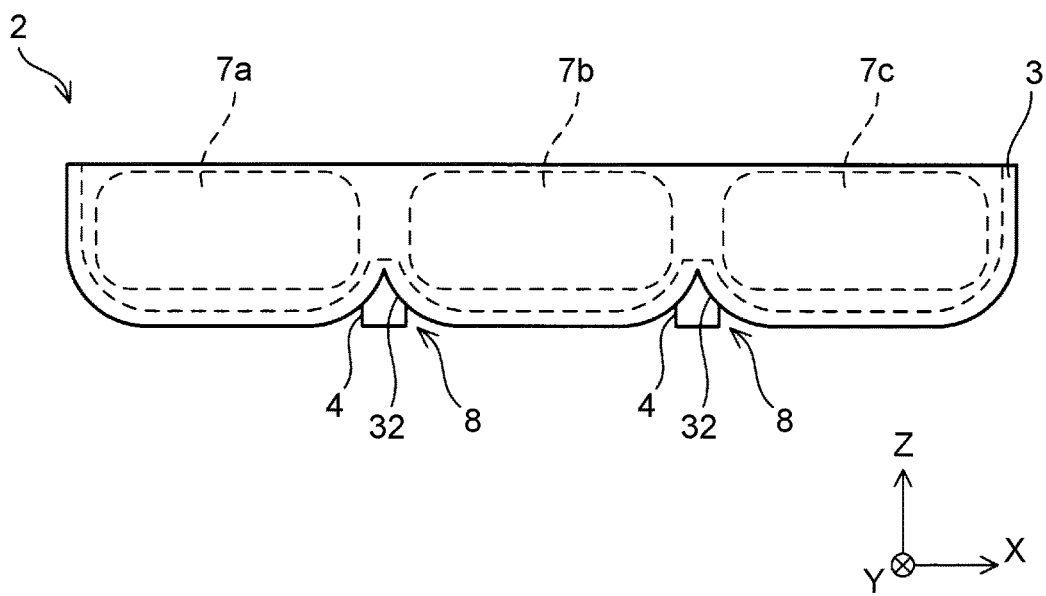
FIG. 2 is a side view of the capacitor module.
Figure 3:
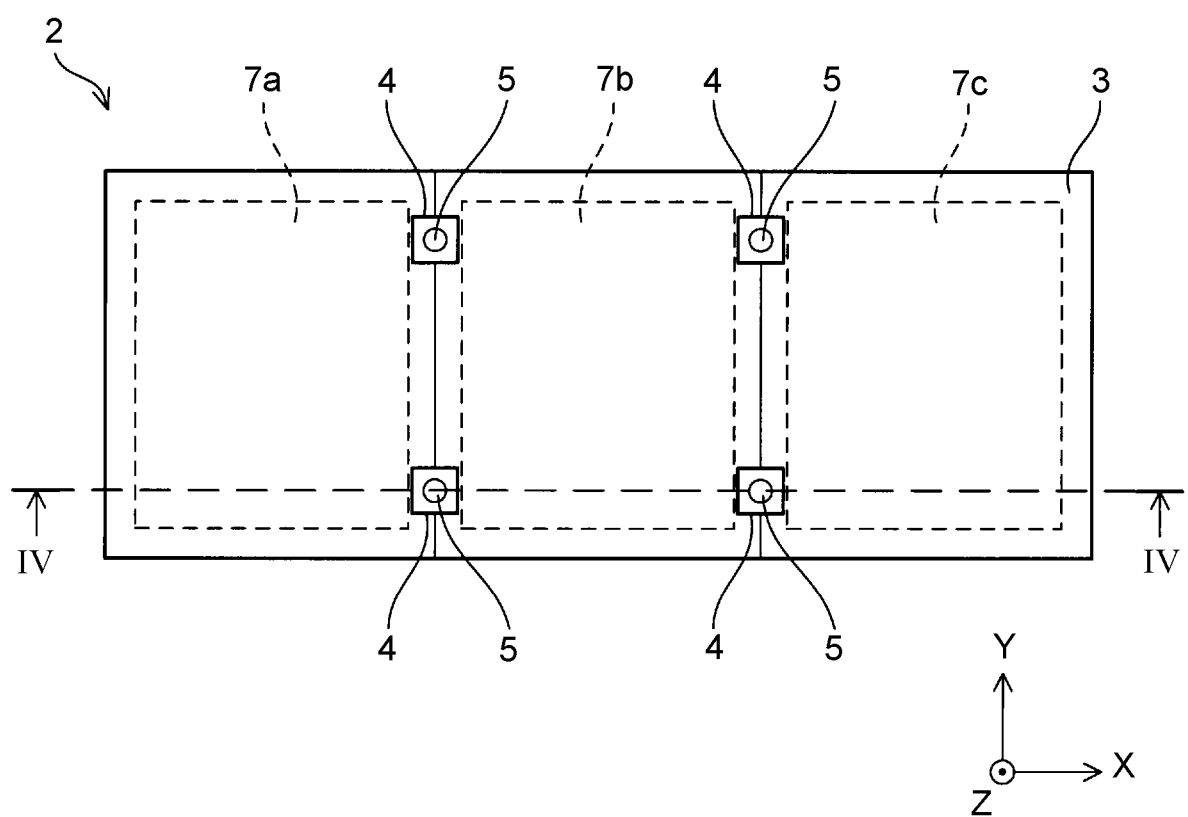
FIG. 3 is a bottom view of the capacitor module.
Figure 4:
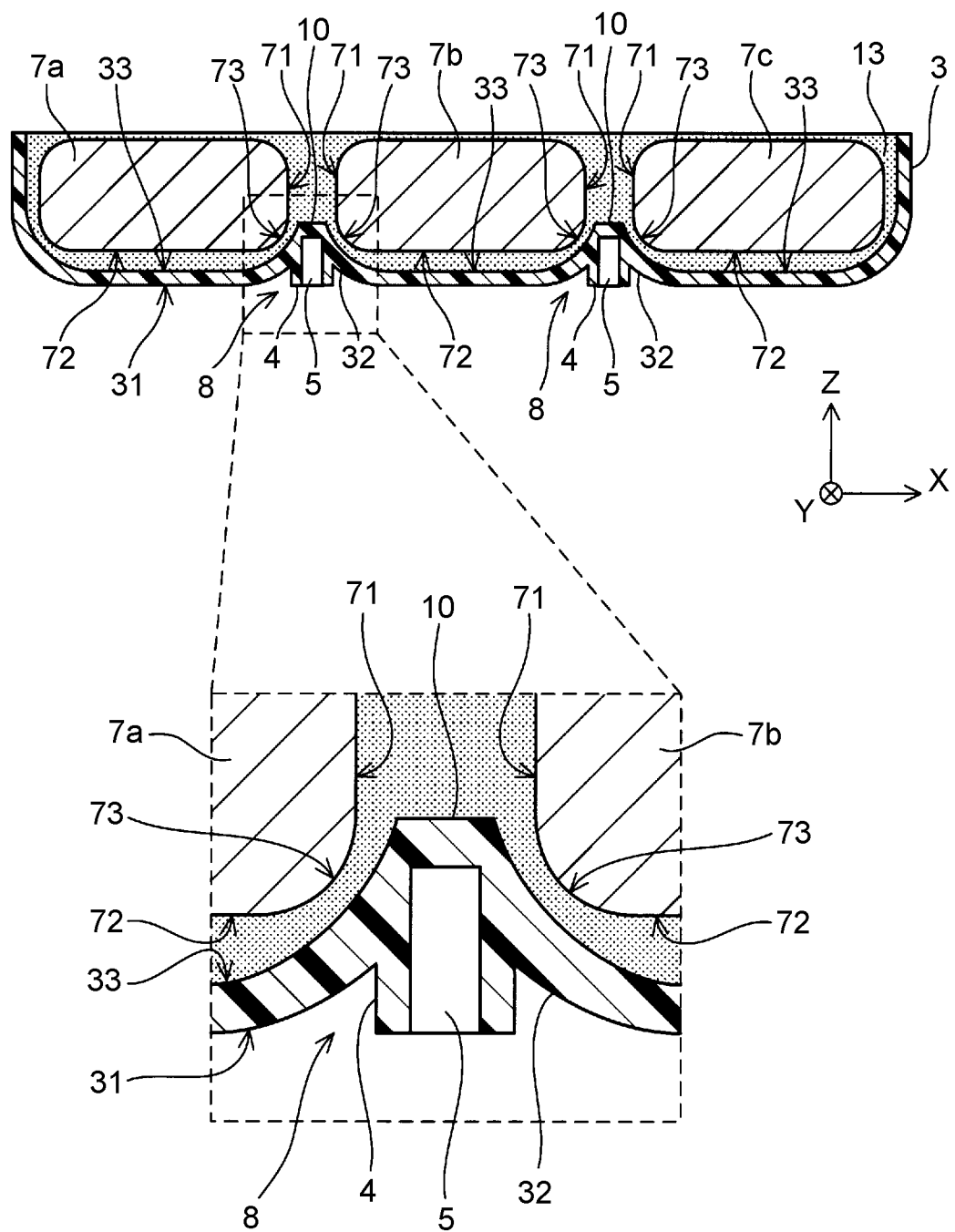
FIG. 4 is a sectional view taken along line IV-IV in FIG. 3 and an enlarged sectional view of an element boundary portion.

FIG. 2 is a side view of the capacitor module 2, and FIG. 3 is a bottom view of the capacitor module 2. FIG. 4 is a sectional view taken along line IV-IV in FIG. 3. The structure of the capacitor module 2 will be described with reference mainly to FIG. 4. In all the drawings, a conductor that electrically connects the capacitor elements 7a, 7b, 7c to one another is not shown.

Each of the capacitor elements 7a, 7b, 7c has a shape of a rounded rectangular prism. The Y-direction in the coordinate system of the drawings coincides with an axial direction of the prism of each of the rounded rectangular prism-shaped capacitor elements 7a, 7b, 7c. A pair of side surfaces of the rounded rectangular prism of each of the capacitor elements 7a, 7b, 7c will be referred to as first side surfaces 71, and a side surface adjoining the first side surfaces 71 will be referred to as a second side surface 72. The capacitor elements 7a, 7b (7b, 7c) are placed in parallel such that the first side surfaces 71 face each other, and are housed inside the case 3 such that the second side surfaces 72 adjoining the first side surfaces 71 face a bottom surface on an inner side (inner bottom surface 33) of the case 3. A molding resin 13 (or a potting material) is packed between an inner surface of the case 3 and the capacitor elements 7a, 7b, 7c.

Rounded corners of the capacitor elements 7a, 7b, 7c each corresponding to a boundary between the first side surface 71 and the second side surface 72 will be referred to as rounded corners 73. A portion of a bottom part of the case 3 sandwiched between the rounded corner 73 of the capacitor element 7a and the rounded corner 73 of the capacitor element 7b will be referred to as an element boundary portion 8. An enlarged view of the element boundary portion 8 is shown on the lower side of FIG. 4. The element boundary portion between the capacitor element 7b and the capacitor element 7c has the same structure.

A ridge 10 extending along the axial direction of the capacitor element 7a is provided at the element boundary portion 8 on the side of the bottom surface on the inner side (inner bottom surface 33) of the case 3. As described above, the groove 32 extending in the axial direction of the capacitor element 7a is provided in the outer bottom surface 31 of the case 3, between the capacitor elements 7a, 7b (on the side of the outer bottom surface 31 at the element boundary portion 8). The ridge 10 and the groove 32 are disposed so as to overlap each other as seen from the Z-direction in FIG. 4, i.e., a direction normal to the outer bottom surface 31. The ridge 10 is provided so as to project into a space between the opposite rounded corners 73 of the adjacent capacitor elements 7a, 7b. It is possible to provide the groove 32 on the side of the outer bottom surface 31 by thus providing the ridge 10 so as to increase the thickness of the bottom part at the element boundary portion 8. Moreover, it is possible to provide the hole 5 having a depth larger than the thickness of portions of the bottom part of the case 3 other than the element boundary portion 8, by thus providing the ridge 10 at the element boundary portion 8 of the bottom part so as to increase the thickness of the bottom part.

The groove 32 has a V-shape, and the protrusion 4 is provided in the groove 32. The protrusion 4 is provided so as to be in contact with side surfaces of the V-shaped groove 32. The hole 5 is provided in a leading end surface of the protrusion 4. The leading end surface of the protrusion 4 is provided in the same plane as a flat portion of the outer bottom surface 31 facing the second side surface 72 of the capacitor element 7a. Thus, the protrusion 4 does not add to the external dimensions of the capacitor module 2. As described above, the protrusion 4 and the hole 5 are used for positioning in handling the capacitor module 2. In the capacitor module 2 of the embodiment, the element boundary portion 8 provided between the adjacent capacitor elements 7a, 7b (7b, 7c) is effectively used to realize the positioning protrusion 4 and hole 5 without increasing the external dimensions.

Figure 5:
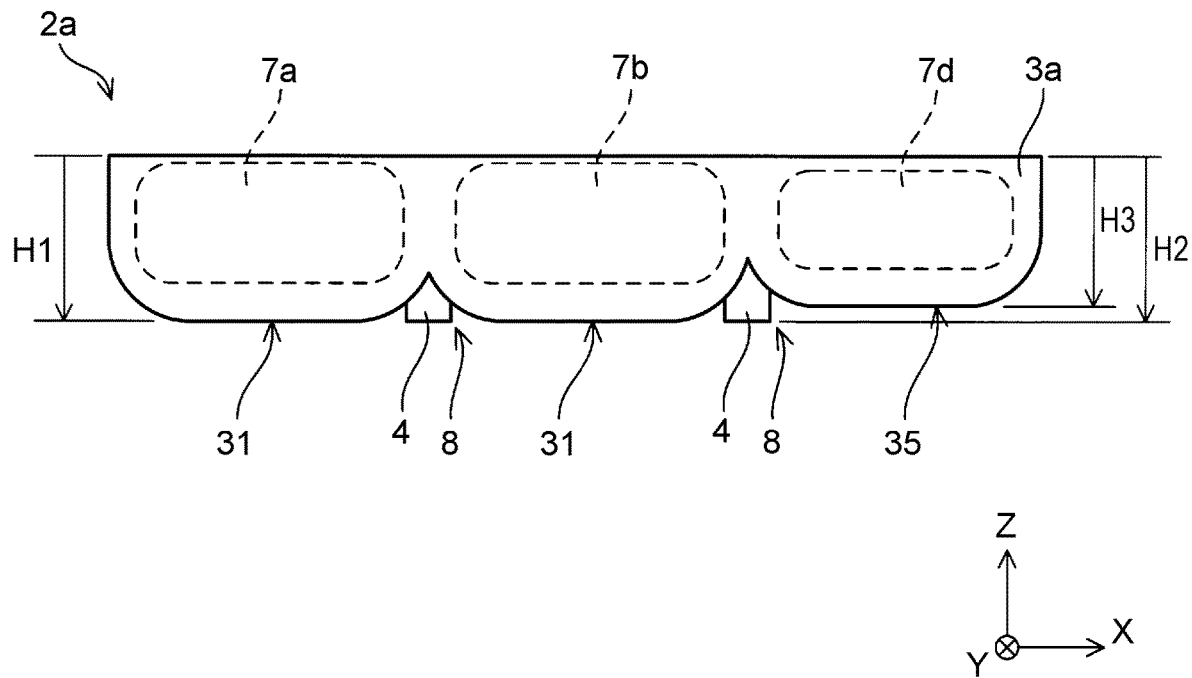
FIG. 5 is a side view of a capacitor module in a first modified example of the embodiment of the present disclosure.

FIG. 5 is a side view of a capacitor module 2a in a first modified example of the embodiment. In the capacitor module 2a of the first modified example, three capacitor elements 7a, 7b, 7d are housed in a case 3a. The capacitor element 7d is one size smaller than the other two capacitor elements 7a, 7b. According to the size of the capacitor element 7d, a case height H3 from an upper part of the case 3a to a flat portion of an outer bottom surface 35 facing the capacitor element 7d is smaller than a case height H1 to the flat portion of the outer bottom surface 31 facing the capacitor elements 7a, 7b. The case 3a has the protrusions 4 at the element boundary portions 8. A height H2 from the upper part of the case 3a to the leading end surface of the protrusion 4 is larger than the height H3 to the outer bottom surface 35 facing the capacitor element 7d but equal to the height H1 to the outer bottom surface 31 facing the capacitor elements 7a, 7b. Thus, the leading end surface of the protrusion 4 (height H2) is located farther on a case outer side than the flat portion of the outer bottom surface 35 (height H3) facing the smaller capacitor element 7d, but is located in the same plane as the flat portion of the outer bottom surface 31 (height H1) facing the larger capacitor elements 7a, 7b. The leading end surface of the protrusion may be either located in the same plane as the flat portion of the bottom surface corresponding to the maximum height of the case, or located farther on the case inner side than that flat portion. Thus, the protrusion does not add to the external dimensions of the case.

Figure 6:
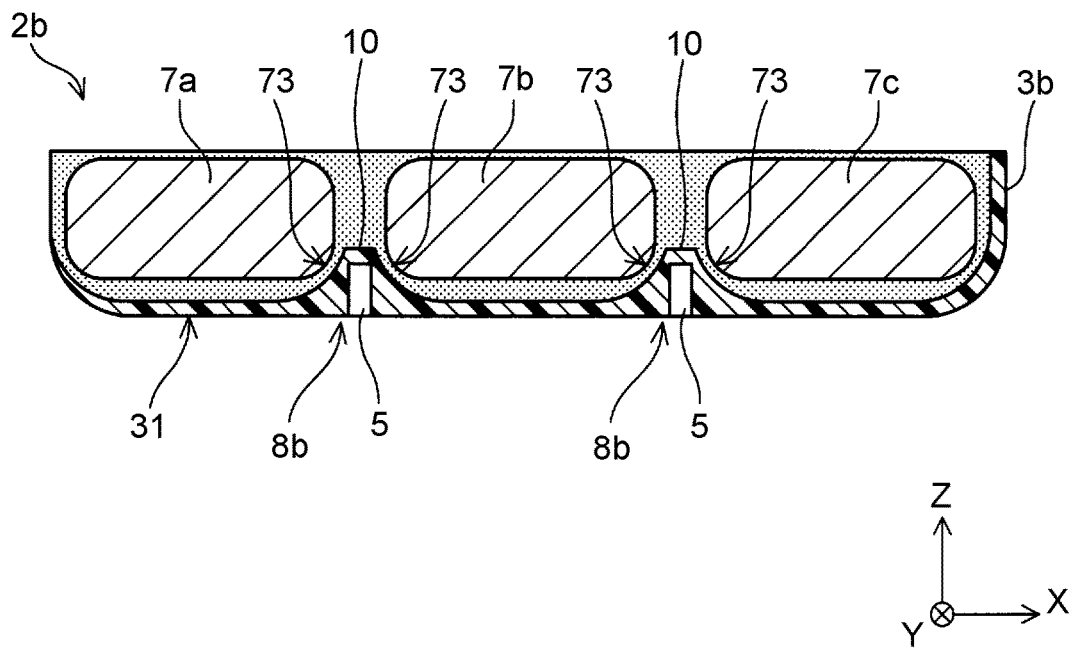
FIG. 6 is a sectional view of a capacitor module in a second modified example of the embodiment of the present disclosure.

FIG. 6 is a sectional view of a capacitor module 2b in a second modified example of the embodiment. Like the capacitor module 2 of the embodiment, the capacitor module 2b includes a case 3b housing the three capacitor elements 7a, 7b, 7c. Unlike the capacitor module 2 of the embodiment that includes the grooves 32 and the protrusions 4 on the side of the outer bottom surface 31 at the element boundary portions 8, the capacitor module 2b of the second modified example includes no grooves and protrusions at element boundary portions 8b of the case 3b. However, the ridges 10 are provided on the side of the inner bottom surface of the case 3b at the element boundary portions 8b, and the positioning holes 5 are provided on the side of the outer bottom surface at the element boundary portions 8b. It is possible to provide the capacitor module 2b with the hole 5 having a depth larger than the thickness of portions of the bottom part other than the element boundary portion 8b, by thus providing the ridge 10 so as to project into the space between the rounded corners 73 of the adjacent capacitor elements 7a, 7b (7b, 7c).

While the grooves on the side of the outer bottom surface at the element boundary portions 8b may be omitted as in the capacitor module 2b of FIG. 6, providing the grooves on the side of the outer bottom surface at the element boundary portions 8 as in the capacitor module 2 of the embodiment reduces the weight and saves the material cost of the module.

The following are notes on the technique having been described in the embodiment. The protrusions 4 or the holes 5 provided on the side of the outer bottom surface at the element boundary portions are provided for positioning, and the handling device inserts pins for positioning the case 3 into the protrusions 4 or the holes 5 in the manufacturing process. The protrusions 4 or the holes 5 may be used to pass bolts for fixing the capacitor module 2 to a casing of an electric device. The number of the protrusions or the number of the holes is not limited. The number of the capacitor elements housed in the case may be any number not smaller than two.

While the specific examples of the present disclosure have been described above in detail based on the embodiment, the first modified example, and the second modified example, these examples are merely illustrative and do not limit the scope of claims. The technique described in the scope of claims includes the above-illustrated specific examples with various changes and modifications made thereto. The technical elements described in this specification or the drawings exhibit technical utility independently or in various combinations, and the combinations thereof are not limited to those described in the claims as filed. The technique illustrated in this specification or the drawings can achieve a plurality of objects at the same time, and has technical utility simply by achieving one of the objects.

What is claimed is:

1. A capacitor module, comprising:
   at least two rounded rectangular prism-shaped capacitor elements; and
   a case housing the capacitor elements,
   wherein two of the capacitor elements are disposed in parallel in the case such that respective first side surfaces of the capacitor elements face each other,
   wherein the case houses the capacitor elements such that second side surfaces of the capacitor elements face a case inner bottom surface of the case, the second side surface being adjoining the first side surface,
   wherein the case includes a protrusion on a side of a case outer bottom surface of the case at an element boundary portion sandwiched between two rounded corners, and the round corners being each provided at a boundary between the first side surface and the second side surface, the protrusion includes a hole opening at the case outer bottom surface,
   wherein a groove extending along an axis of the capacitor element is provided on the side of the case outer bottom surface at the element boundary portion,
   wherein the protrusion is provided in the groove, and
   wherein a leading end surface of the protrusion is provided in the same plane as a flat portion of the case outer bottom surface corresponding to the second side surface of the capacitor element.

2. A capacitor module, comprising:
   at least two rounded rectangular prism-shaped capacitor elements; and
   a case housing the capacitor elements,
   wherein two of the capacitor elements are disposed in parallel in the case such that respective first side surfaces of the capacitor elements face each other,
   wherein the case houses the capacitor elements such that second side surfaces of the capacitor elements face a case inner bottom surface of the case, the second side surface being adjoining the first side surface,
   wherein the case includes a protrusion on a side of a case outer bottom surface of the case at an element boundary portion sandwiched between two rounded corners, and the round corners being each provided at a boundary between the first side surface and the second side surface, the protrusion includes an interior ridge that only partially extends between the first side surfaces of the capacitor elements, and
   wherein the protrusion includes a hole opening at the case outer bottom.

3. The capacitor module according to claim 2, wherein:
   a groove extending along an axis of the capacitor element is provided on the side of the case outer bottom surface at the element boundary portion;
   the protrusion is provided in the groove; and
   a leading end surface of the protrusion is provided in the same plane as a flat portion of the case outer bottom surface corresponding to the second side surface of the capacitor element.

4. The capacitor module according to claim 2, wherein:
   a groove extending along an axis of the capacitor element is provided on the side of the case outer bottom surface at the element boundary portion;
   the protrusion is provided in the groove; and
   a leading end surface of the protrusion is located on a more inner side of the case than a flat portion of the case outer bottom surface corresponding to the second side surface of the capacitor element.

* * * * *